Oct. 29, 1940.  E. O. ENGELS  2,219,329
METHOD OF TOASTING DISCRETE MATERIALS
Filed Feb. 20, 1939

INVENTOR
EUGENE OSCAR ENGELS
BY
ATTORNEY.

Patented Oct. 29, 1940

2,219,329

UNITED STATES PATENT OFFICE 2,219,329

METHOD OF TOASTING DISCRETE MATERIALS

Eugene Oscar Engels, Saginaw, Mich., assignor to Baker Perkins Company, Inc., Saginaw, Mich., a corporation of New York Application February 20, 1939, Serial No. 257,376

7 Claims. (Cl. 53—21)

This invention relates to the art of toasting. It embraces in general a method for toasting various flaky or puffed granular or discrete substances such as rice, wheat, or materials of the nature of corn flakes, potato chips and the like.

To explain the invention I have chosen as the material to be toasted, kernels of corn that have been fractionated and rolled into thin, soft, somewhat rubber-like flakes.

Correct appreciation of the novelty and advantages in use of my new process requires a brief exposition of well known occurrences which should attend the toasting of such discrete materials.

The surfaces of each piece or flake should be heated evenly and quickly at the beginning so as to cause underlying moisture to suddenly vaporize and expand, producing surface bubbles that harden immediately. The flake should then be cooked through and toasted to the desired color shade.

The finished flakes should possess the following characteristics: proper crispness with no leathery spots; a uniformly delicate straw color without dull areas. All flake surfaces should be occupied by bubbly protuberances distributed as nearly uniformly as possible. The bubbles should be of approximately equal size, for sheen and brilliance. There should be no scorched pieces and practically no broken ones—at least no considerable amount of fines to be screened out.

Heretofore, the above-mentioned desirable results have been attained to some extent by various methods but not to the satisfaction of the industry from the standpoints of low cost production, conservation of material, and high quality of the finished product.

For many years a so-called tumbling barrel method was commonly used, wherein the material was repeatedly lifted and poured upon itself while the revolving barrel was being heated from an adjacent furnace.

That method, however, fell short, particularly in respect to the quality of its product. For instance, the bubbles on the surface of the individual flakes were often of unequal size, unevenly distributed. Scorched flakes often appeared in the finished product to the detriment of flavor and appearance. Costly belt inspection was employed for their removal from the finished goods, and that entailed waste of material because some marketable flakes were always inadvertently discarded along with charred ones. Moreover, some flakes were tough and under done in spots because their surfaces had been more or less overlapped and blanketed one upon another in the tumbling barrel. Uniform delicacy of tint or color was not consistently maintained, probably because the externally heated barrel presented hot metal upon which portions of a pile of flakes might bunch and remain too long, toasting the charge unevenly. The tumbling barrel heating system was difficult to control so as to maintain uniform quality in the finished goods, and required the attention of skilled operators.

The purpose of my improved method is, generally, to produce a superior toasted product in a better way and more economically than has been done heretofore either by the tumbling barrel or any other method known to me.

Other objects are, more specifically, to provide for heating all the surface areas of each piece quickly enough in the beginning to approach flash evaporation of sub-surface moisture and thereby create the desired kind of uniform bubbly surface; to provide means that will remove every piece from contact with any hot metal part, repeating such removal frequently enough throughout the whole period of treatment to prevent scorching any pieces; and, with fragile and delicate pieces such as corn flakes, to avoid breakage by providing against the harmful impingement of individual pieces against other pieces or against the container.

In solving these and certain related problems, I have modified some steps of previously known processes employed for treating other materials, and I recombine certain steps, thus developing an improved process which in practice can be depended upon to yield a product possessing the characteristics desired.

In carrying out my process, the material to be treated, for example, the somewhat rubbery, slightly sticky, thinly rolled kernels of corn above mentioned, is divided into small unit charges, and each charge is treated in an individual container having upright side walls and perforate top and bottom.

Considered as pertaining to a process, the invention claimed herein is to be regarded as not limited to apparatus used to practice the process, although mechanisms, that are capable of embodying it will be described. A way of using the process, which I conceive to be the best way will be explained but is intended to be merely illustrative of how the principle may be reduced to practice.

The accompanying drawing represents diagrammatically cross-sectional views of a container, showing the typical action of the gas flow, the distribution of the unit charge being shown in the various stages and steps comprising one cycle of operations.

Figure 1:
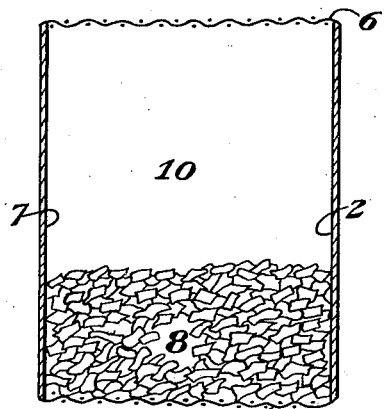
Fig. 1 shows in section a container with a unit charge.

The apparatus shown in the drawing is a container or basket having walls 2 and 7 and perforate screen bottom 4 and top 6. 8 designates the unit charge and 1 is a stream of hot gas of smaller area than the bottom 4 the stream being directed upwardly through the bottom 4 so as to lift up and float a fractional part only of the unit charge 8.

Figure 2:
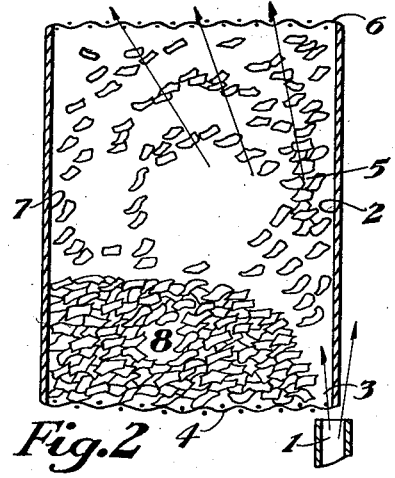
Fig. 2 is a similar view, showing the commencement of operation of a gas stream under the unit charge.

Referring first to Fig. 2, the stream 1 of hot gas passes upward along the inner face of wall 2 and commences to blow away all flakes from a small area 3 of the screen bottom, 4, propelling the dislodged pieces 5 upwardly along the wall 2 to the perforate top 6. The air jet does not necessarily travel up along the side wall 2, but it may be anywhere on the bottom of the unit charge and may travel in any direction, as for instance from one end of the container to the other, instead of traveling crosswise as in the present example.

The area of the stream 1 being smaller than the area of the container top 6, the ascending current of gas, indicated by arrows, expands within the container, loses velocity and allows some of the entrained pieces 5 to drop back upon the as yet undisturbed part of the unit charge. The remainder continue to swirl and recirculate by entrainment in the varying currents and eddys.

The upward gas speed is now fastest along the lower part of the right-hand wall 2 and slowest adjacent the left-hand wall 7, with intermediate speeds at different places throughout the container. Such velocity differences and changes of direction produce a zone of violent flotation, agitation and recirculation in that part of the unit charge adjacent the stream and above the unit charge 8.

During flotation the individual pieces have their surface areas freely and equally exposed to direct contact with the hot gas, an ideal condition for preheating and toasting.

Figure 3:
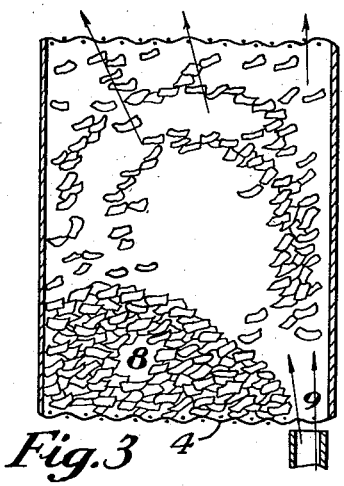
Fig. 3 shows the swirling and recirculating condition as the gas stream commences to exert its full capacity upon a fractional part of the unit charge near a wall of the container.

In Fig. 3 the upward stream has begun to eat its way back into the mass 8, clearing all flakes away from an area 9 of the bottom 4 equal to the cross-section area of stream 1. Volcanic action is greater now than it was, Fig. 2, because the full area of the stream 1 is now operating and consequently the fractional portion of the unit charge which is kept in free flotation, is greater. Swirling of the flakes, Figs. 2 and 3, is mainly in counter-clockwise direction.

Figure 4:
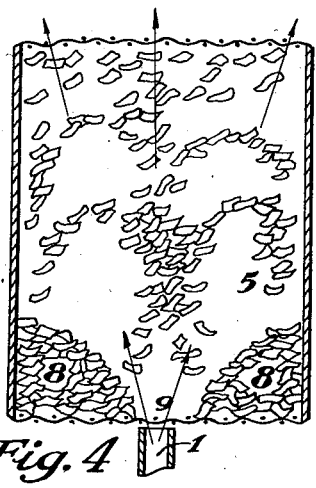
Fig. 4 is a similar view, showing the gas stream in action at the middle of the container.

In Fig. 4 the stream 1 is shown at the middle of the container, and the swirling action is partly clockwise and partly counter-clockwise.

Figure 5:
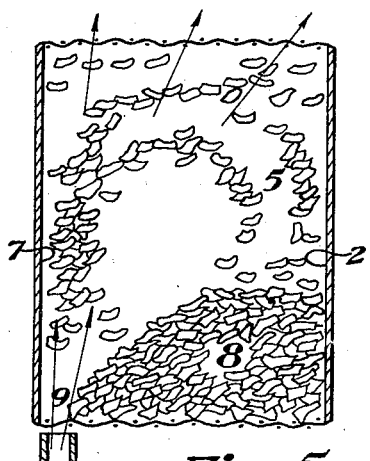
Fig. 5 shows the effect of the stream at the opposite side of the container as it is about to complete its progressive blowing up of the unit charge.

In Fig. 5 the jet 9 has arrived at the opposite wall 7 of the container where it acts as described in Fig. 3, but the principal swirling action is in the reverse or clockwise direction from that of Fig. 2.

It will now be apparent that at the commencement of the cycle the entrainment of pieces and their recirculation alongside the wall 2 is in one direction, counter-clockwise, and at the end of the cycle is in the reverse, clockwise, direction. At intermediate parts of the container it is in both directions.

In the cycle shown, Figs. 2 to 5, the stream of hot gas during its travel across the bottom screen 4 has dislodged in regular order all pieces of material within the container. Hence there can not be any scorching due to prolonged contact of flakes with hot metal surfaces; yet there is swift and effective utilization of the toasting heat in the gas during the flotational agitation of the pieces while kept in suspension in the upper part 10 of the container.

No substantial amount of material can be blown out of the closed container at any stage of the cycle. Although pieces are carried in all directions in the various gas currents they will not be broken or damaged to any undesirable extent by striking each other or by hitting the walls or screens, because they float in the local currents and eddys of gas and when they do strike the force is slight with no appreciable amount of breakage. My method distinguishes importantly in that regard from action in a tumbling barrel where masses of fragile flakes were rolled over and over upon themselves. Breakage and abrasion in that method of handling were sources of considerable loss and damage.

The following is an example of the manner in which the foregoing method has been successfully applied in practice to the toasting of corn flakes on a large commercial scale.

This example from actual practice is given as an instance of use in practice of the method herein described, but is not intended as a limitation of my invention.

The unit charge containers are 6-inches wide and 48-inches long. The gas streams which are delivered upwardly against the perforate bottoms of the containers comprise two parallel rows of jets each row having forty seven ¹¹⁄₁₆-inch diameter nozzles. The rows are spaced 1-inch on center lines and the individual apertures in each row are staggered with relation to those of the other row. The total area of the 94 nozzles is about thirty-five square inches. The total area of a container bottom is two hundred eighty-eight square inches, being between eight and nine times the area of the nozzles.

There is put into each container a small unit charge of material to be toasted, the top of the unit charge being about one-third to one-half of the height of the container from the bottom.

The fractional portion of the unit charge 8 displaced at one time above the nozzles and put into circulation by the upward stream 1 of toasting gas is equal to approximately one-eighth or one-ninth of the total volume of the unit charge. The gas temperature may be 400 to 500° Fahrenheit.

The circulating and agitating zone 10 above the unit charge is of appropriate size to accommodate approximately a one-ninth fractional part of the unit charge, being the part which is kept in flotation at any given time.

From the foregoing description it will be seen that in my improved method all of the advantages are attained which are mentioned in the statement of objects of the invention, and in a completely satisfactory and economical manner. The method as a whole constitutes what is believed to be a new and unique treatment for material of this kind.

Dividing of the material into unit charges, and placing each charge in a closed container large enough to hold the charge and to accommodate in addition a predetermined fractional part thereof, swirling and in suspension, creates a condition favorable to the complete exposure of the individual flakes to toasting by circulation of hot gas.

Using a stream of hot toasting gas to dislodge at a time a small part of the charge and dispersing that part in a zone of the chamber above the main portion of the charge, thus creating a condition of free flotation and uniform toasting action upon the fractional part thus displaced, enables the unit charge to be treated a fraction at a time, all fractions alike.

Progressively subjecting the remaining portion of the charge to like flotational agitation until all parts of the entire unit charge have been treated alike enables the user of the method to be sure of a uniformly toasted product without any scorched particles or any tough improperly cooked areas, and with substantially every flake covered with brilliant bubble-like protuberances of nearly uniform size and very evenly distributed.

The container may be rectangular or any other desired shape and the gas stream may be delivered by a straight line nozzle, or for example, it may be chevron-shaped or arranged in bowed form, or disposed in a line diagonal to the length of the container. The nozzle aperture may be a long slit or a row or rows of apertures.

The thoroughness of the uniform toasting action peculiar to this process can be better appreciated by keeping in mind the unique manner in which a constantly changing fractional part of the unit charge is floated and agitated and toasted in a closed zone. This zone is filled with swirling flakes subject to the toasting action of the gas, but the flakes thus floated are continually being changed, since the stream of gas is caused to progressively encounter other parts of the unit charge. During such progressive action of the stream every fractional part of the unit charge must take its turn in the zone of free suspension, agitation, returning to a static condition only to be picked up again before scorching can occur, and put through the same cycle of operations as many times as may be necessary to complete the toasting action.

By the term "stream" is meant a current of gas from a single discharge orifice, as a slot, or from several associated jets.

The gas current is kept hot enough to toast but not hot enough to burn flakes that are in flotation. No metal part of the container can become hotter than the gas. Moreover, since prolonged direct contact of flakes with the highly heat-conductive hot metal can not occur, there can be no charring.

In the beginning the surface temperature of each flake is raised suddenly by being intimately contacted all over by the hot gas. At once vapors are generated at the flake surfaces, developing a great number of bubble-like protuberances which are evenly distributed over the flake surfaces. They are substantially uniform in size and immediately harden to shell-like brittleness. During the subsequent and repeated flotation the fragile flake cooks clear through and is crisped and toasted equally all over to a desired color shade. Finally this is accomplished without any important amount of breakage, since at all times in their agitation, lifting, and turning, the flakes are both impelled and cushioned by currents and layers of air. They are not subjected to punishment by mechanical devices which have been used heretofore in apparatus for drying, toasting or cooking materials of the kind to which this process is adapted.

In the foregoing description my method has been explained particularly with reference to its use in treating materials that are light or flaky. It is, however, adaptable for other purposes, such as the roasting of coffee beans, cocoa beans and the like, by merely increasing the force of the stream of hot gas and altering the jet areas to suit the material.

Having thus described my invention, what I claim and desire to secure by Letters Patent is:

1. A process for toasting fragile discrete material pieces comprising confining a unit charge within a closed container having perforate top and bottom, said charge being equal to approximately one-third to one-half of the capacity of the container; directing a stream of gas heated to appropriate toasting temperature upwardly against a fractional part only of the bottom area of said confined charge, through a zone of the container and out through the perforate top in expanded condition; the velocity of said stream being sufficient to drive said portion clear of the bottom of said container and distribute it throughout said zone in a condition of temporary free flotation with gradual settling of floated pieces upon the undisturbed portion of the charge; moving the unit charge and gas stream relatively to each other until the entire bottom area of the unit charge has been subjected to like treatment, and repeating said operations on the said unit charge until toasting is finished.

2. A process for toasting fragile discrete material pieces comprising confining a unit charge within a closed container having perforate top and bottom; directing a stream of gas heated to appropriate toasting temperature upwardly against a portion only of the bottom area of said confined charge, through a zone of the container in expanded condition and out through the perforate top; said stream having velocity sufficient to drive said portion clear of the bottom of said container and distribute it throughout said zone in a condition of temporary free flotation with gradual settling of floated pieces upon the as yet undisturbed portion of the charge; moving the unit charge and gas stream relatively to each other until the entire bottom area of the unit charge has been subjected to like treatment.

3. Process for toasting discrete material comprising confining within a closed container a unit charge of such material, applying to a fractional portion only of the bottom area of said confined charge a stream of toasting gas at sufficient velocity to drive all of said portion into an enclosed zone in the chamber above the remainder of the charge; allowing the gas stream to expand thereby putting said fractional portion temporarily into free flotation within such zone, exposing the pieces in suspension to the action of the toasting gas; allowing the pieces to settle upon the relatively quiescent remainder of the charge; and moving the unit charge and gas stream relatively to each other until the entire charge has been subjected to like flotational agitation.

4. Process for toasting comprising confining within a closed container a unit charge of discrete material comprising a bed of substantially uniform thickness, impelling a portion only of the material comprising the bottom area of said bed into an enclosed zone above the remainder of the charge by the action of a stream of gas heated to toasting temperature; putting such impelled portion into temporary free flotation within such zone and thereby exposing the individual pieces thereof to the toasting action of said heated gas; applying said stream gradually to the remaining unimpelled portions of the bottom area of said bed.

5. Process for toasting comprising; confining a unit charge of discrete material within a closed container with perforate top and bottom; directing a stream of gas heated to toasting temperature and under pressure against a fractional part only of the area of the base of the contained charge and thereby driving such part into a closed zone of the container above the substantially unaffected remainder of the charge and putting the individual pieces of such fractional part into a condition of temporary free flotation and agitation within said zone; and gradually subjecting like fractional parts of the remainder of the bottom area of said charge similarly to the gas stream action, whereby the said closed zone is kept supplied with a changing series of individual pieces of material in suspension until all parts of the said charge have been acted upon in regular order by the toasting gas substantially in the manner described and for the purposes set forth.

6. Process for toasting comprising; confining within a closed container a unit charge of discrete material, impelling a portion only of the bottom area of said charge into an enclosed zone above the quiescent remainder of the charge by the action of a stream of gas heated to toasting temperature; putting such impelled portion into temporary free flotation within such zone and thereby exposing the individual pieces thereof to the toasting action of said heated gas; and impelling said stream in like manner against the remaining bottom area portions of said confined unit charge by moving the container bottom progressively across said stream of gas.

7. In a process for toasting discrete materials, the operating step comprising; confining a unit charge layer of discrete material within a closed container with perforate top and bottom of substantially equal areas; directing a stream of gas, heated to toasting temperature and under pressure, against a fractional part only of the area constituting the bottom face of the charge, while permitting the remainder of the charge to remain quiet, such pressure being sufficient to drive the pieces constituting said fractional part into a closed zone of the container above the remainder of the charge in a condition of temporary free flotation and agitation within said zone, thus exposing all surfaces of the pieces comprising said fractional part to the toasting action of said gas while keeping the remainder of the charge substantially quiescent.

EUGENE OSCAR ENGELS.